(12) United States Patent
Amarilio et al.

(10) Patent No.: US 9,949,010 B2
(45) Date of Patent: Apr. 17, 2018

(54) LOW LATENCY TRANSMISSION SYSTEMS AND METHODS FOR LONG DISTANCES IN SOUNDWIRE SYSTEMS

(71) Applicant: QUALCOMM Incorporated, San Diego, CA (US)

(72) Inventors: Lior Amarilio, Yokneam (IL); Terrence Brian Remple, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/145,089

(22) Filed: May 3, 2016

(65) Prior Publication Data
US 2016/0337741 A1    Nov. 17, 2016

Related U.S. Application Data

(60) Provisional application No. 62/159,533, filed on May 11, 2015.

(51) Int. Cl.
*G06F 17/00* (2006.01)
*H04R 1/10* (2006.01)
(Continued)

(52) U.S. Cl.
CPC .......... *H04R 1/1033* (2013.01); *G06F 3/162* (2013.01); *G06F 13/4045* (2013.01);
(Continued)

(58) Field of Classification Search
CPC ... G06F 3/162; G06F 13/4045; H04B 1/3833; H04R 1/1033; H04R 3/005; H04R 3/12
(Continued)

(56) References Cited

U.S. PATENT DOCUMENTS

| 4,959,833 A | 9/1990 | Mercola et al. |
| 6,185,643 B1 | 2/2001 | Kirshtein et al. |

(Continued)

FOREIGN PATENT DOCUMENTS

GB    2429613 A    2/2007

OTHER PUBLICATIONS

International Search Report and Written Opinion for PCT/US2016/030643, dated Jul. 28, 2016, 12 pages.
(Continued)

*Primary Examiner* — Hemant Patel
(74) *Attorney, Agent, or Firm* — Withrow & Terranova, PLLC

(57) ABSTRACT

Low latency transmission systems and methods for long distances in SOUNDWIRE systems are disclosed. In an exemplary aspect, a SOUNDWIRE sub-system is coupled to a long cable through a bridge. The bridge converts SOUND-WIRE signals to signals for transmission over the long cable and converts the signals from the long cable to the SOUND-WIRE signals for transmission in the SOUNDWIRE sub-system. Conversion between signal types may include concatenating signals of a similar type into a group that is serially transmitted over the long cable. Concatenation of bit slots in this manner consumes minimal overhead in bus turnaround, thereby reducing latency. In further aspects, the functionality of the bridge may be incorporated into a headset or a mobile terminal.

13 Claims, 10 Drawing Sheets

(51) Int. Cl.
    *G06F 13/40*      (2006.01)
    *G06F 3/16*       (2006.01)
    *H04B 1/3827*     (2015.01)
    *H04R 3/00*       (2006.01)
    *H04R 3/12*       (2006.01)

(52) U.S. Cl.
    CPC .......... *H04B 1/3833* (2013.01); *H04R 3/005* (2013.01); *H04R 3/12* (2013.01)

(58) Field of Classification Search
    USPC ................................. 455/550.1–570; 700/94
    See application file for complete search history.

(56) References Cited

U.S. PATENT DOCUMENTS

| | | | |
|---|---|---|---|
| 6,430,632 B1* | 8/2002 | Ain | G06F 13/4045 710/100 |
| 2014/0244884 A1* | 8/2014 | Segev | G06F 13/36 710/305 |

OTHER PUBLICATIONS

Author Unknown, "DRAFT Specification for Serial Low-power Inter-chip Media Bus (SLIMbus®)," MIPI Alliance, Version 1.3, Revision 06, Feb. 14, 2015, 256 pages.
Author Unknown, "Specification for SoundWire," MIPI Alliance, Version 1.0, Jan. 21, 2015, 289 pages.
Second Written Opinion for PCT/US2016/030643, dated Apr. 12, 2017, 6 pages.
International Preliminary Report on Patentability for PCT/US2016/030643, dated Aug. 18, 2017, 29 pages.

* cited by examiner

LOW LATENCY TRANSMISSION SYSTEMS AND METHODS FOR LONG DISTANCES IN SOUNDWIRE SYSTEMS

PRIORITY APPLICATION

The present application claims priority to U.S. Patent Application Ser. No. 62/159,533 filed on May 11, 2015 and entitled "SOUNDWIRE LOW LATENCY TRANSMISSION FOR LONG DISTANCES," the contents of which is incorporated herein by reference in its entirety.

BACKGROUND

I. Field of the Disclosure

The technology of the disclosure relates generally to the SOUNDWIRE specification and particularly to handling relatively long communication buses therewith.

II. Background

Mobile terminals have become increasingly common in modern society. These devices have evolved from large, clunky, relatively simple telephonic devices to small, full range, multimedia devices with vastly improved processing power. The early mobile terminals generally provided poor sound quality and little, if any, visual image capacity. As the processing power for these mobile terminals has increased and the range of multimedia options has increased, the quality of the possible audio experience has likewise increased. In particular, contemporaneous mobile terminals may include multiple speakers, multiple microphones and, optionally, may communicate with remote audio devices such as headsets.

The MIPI® Alliance introduced the Serial Low Power Inter-chip Media Bus (SLIMbus®) protocol to help standardize communication between audio elements of a mobile terminal. While effective at providing communication between the audio elements of the mobile terminal, SLIMbus has not seen widespread acceptance by the industry. Accordingly, the MIPI Alliance has introduced the SOUNDWIRE specification to replace the SLIMbus protocol.

The SOUNDWIRE specification provides for a two-wire communication bus that may not exceed fifty centimeters (50 cm) in length. While such distances are readily satisfied for the audio elements within the mobile terminal, such distances may be too short for some regularly used ancillary devices such as a headset. Accordingly, there remains a need for improvements to the SOUNDWIRE specification to allow distances greater than 50 cm.

SUMMARY OF THE DISCLOSURE

Aspects disclosed in the detailed description include low latency transmission systems and methods for long distances in SOUNDWIRE systems. In an exemplary aspect, a SOUNDWIRE sub-system is coupled to a long cable through a bridge. The bridge converts SOUNDWIRE signals to signals for transmission over the long cable and converts the signals from the long cable to the SOUNDWIRE signals for transmission in the SOUNDWIRE sub-system. Conversion between signal types may include concatenating signals of a similar type into a group that is serially transmitted over the long cable. Concatenation of bit slots in this manner consumes minimal overhead in bus turnaround, thereby reducing latency. In further aspects, the functionality of the bridge may be incorporated into a headset or a mobile terminal.

In this regard in one aspect, a bridge is disclosed. The bridge includes a first interface. The first interface is configured to be coupled to a digital audio cable. The bridge also includes a second interface. The second interface is configured to be coupled to a SOUNDWIRE communication bus. The bridge also includes a control system. The control system is configured to receive SOUNDWIRE compliant signals from the second interface and concatenate bit slots from a single source. The control system is also configured to transmit the concatenated bit slots through the first interface onto the digital audio cable. The control system is also configured to receive second concatenated bit slots from the digital audio cable. The control system is also configured to split the second concatenated bit slots for transmission on the SOUNDWIRE communication bus.

In another aspect, a mobile terminal is disclosed. The mobile terminal includes an audio cable receptacle. The mobile terminal also includes an interface associated with the audio cable receptacle. The mobile terminal also includes a control system. The control system is configured to receive SOUNDWIRE compliant signals from one of an application processor and a codec. The control system is also configured to concatenate into respective groups bit slots from plural channels. The control system is also configured to transmit the respective groups through the interface onto a digital audio cable. The control system is also configured to receive second concatenated bit slots from the digital audio cable. The control system is also configured to split the second concatenated bit slots for processing by the one of the application processor and the codec.

In another aspect, a headset is disclosed. The headset includes a plurality of microphones. The headset also includes a plurality of speakers. The headset also includes an audio cable receptacle. The headset also includes an interface associated with the audio cable receptacle. The headset also includes a control system. The control system is configured to receive concatenated bit slots from a digital audio cable. The control system is also configured to split the concatenated bit slots for processing by one of the plurality of microphones or one of the plurality of speakers. The control system is also configured to concatenate into respective groups bit slots received from the plurality of microphones and the plurality of speakers.

In another aspect, a method is disclosed. The method includes concatenating a SOUNDWIRE compliant frame into a serial signal. The method also includes transmitting the serial signal over a digital audio bus greater than fifty centimeters (50 cm) long. The method also includes expanding the serial signal into a second SOUNDWIRE signal. The method also includes transmitting the second SOUNDWIRE signal over a multi-wire bus.

DETAILED DESCRIPTION

Figure 1:
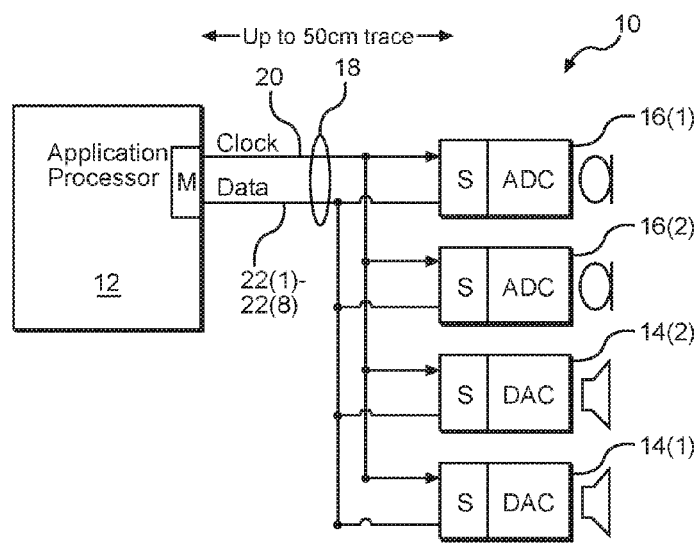
FIG. 1 is a block diagram of an exemplary conventional SOUNDWIRE system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include low latency transmission systems and methods for long distances in SOUNDWIRE systems. In an exemplary aspect, a SOUNDWIRE sub-system is coupled to a long cable through a bridge. The bridge converts SOUNDWIRE signals to signals for transmission over the long cable and converts the signals from the long cable to the SOUNDWIRE signals for transmission in the SOUNDWIRE sub-system. Conversion between signal types may include concatenating signals of a similar type into a group that is serially transmitted over the long cable. Concatenation of bit slots in this manner consumes minimal overhead in bus turnaround, thereby reducing latency. In further aspects, the functionality of the bridge may be incorporated into a headset or a mobile terminal.

Any solution to providing a long distance digital audio interface beyond the fifty centimeters (50 cm) supported by the SOUNDWIRE specification should be able to handle high-end, sophisticated accessories and be capable of transmitting high-rate pulse code modulated (PCM) streams. Further, the solution should also be able to handle low-cost, simple accessories and be capable of transmitting pulse density modulation (PDM) streams. Before addressing how exemplary aspects of the present disclosure create the solutions needed, a brief overview of a SOUNDWIRE system is provided with reference to FIG. 1. The discussion of exemplary aspects of the present disclosure begins below with reference to FIG. 2.

In this regard, FIG. 1 is block diagram of an exemplary conventional SOUNDWIRE system 10. The SOUNDWIRE system 10 includes an application processor 12 coupled to a plurality of microphones 14(1)-14(2) and a plurality of speakers 16(1)-16(2) by a multi-wire bus 18. The multi-wire bus 18 includes a clock line 20 and one or more (up to eight) data lines 22(1)-22(8). The application processor 12 is generally regarded as a master of the SOUNDWIRE system 10, and the plurality of microphones 14(1)-14(2) and the plurality of speakers 16(1)-16(2) (as well as any other audio components) are slaves. While illustrated as the application processor 12, it should be appreciated that the application processor 12 could be replaced by a codec (not illustrated). The multi-wire bus 18 is limited by the SOUNDWIRE specification to less than 50 cm. More information on the SOUNDWIRE specification may be found at Specification for SOUNDWIRE, version 1, released Jan. 21, 2015, available at members.mipi.org/wg/LML/document/folder/8154 to MIPI members. The SOUNDWIRE specification is incorporated by reference in its entirety. As noted, the limit of 50 cm on the length of the multi-wire bus 18 may negatively affect the ability to use certain devices such as a headset with a mobile terminal.

The SOUNDWIRE specification defines a fixed frame having multiple lanes (up to eight). In practice, each lane is assigned to one of the one or more data lines 22(1)-22(8) of the multi-wire bus 18. The frame has rows and columns. In each row, bit slots are provided that may change from any source to any other source. It should be appreciated that having a bus turnaround for each bit slot imposes a substantial overhead penalty on the multi-wire bus 18.

Figure 2:
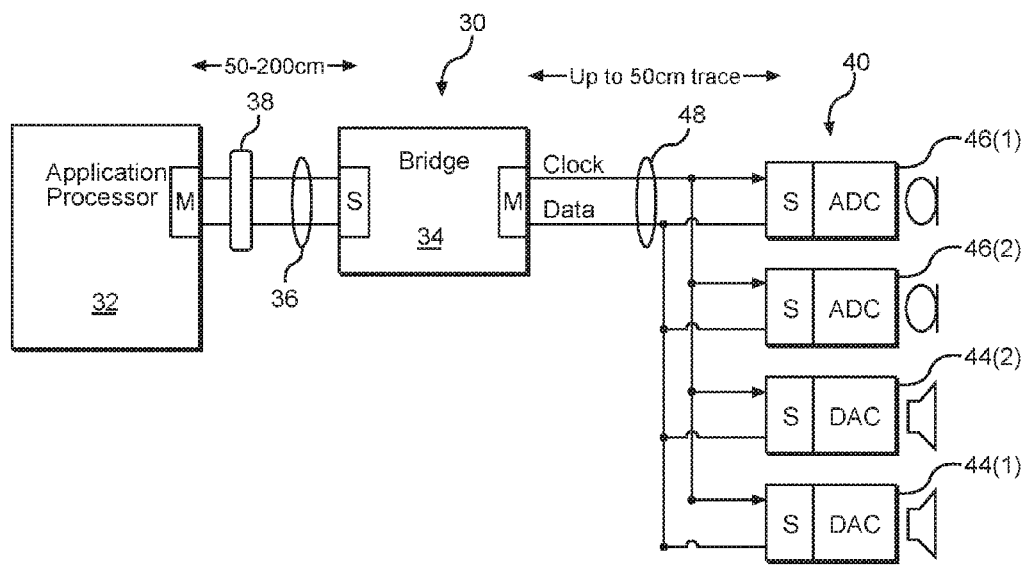
FIG. 2 is a block diagram of a modified SOUNDWIRE system enabling long distance connections according to exemplary aspects of the present disclosure.

Exemplary aspects of the present disclosure allow the length of the multi-wire bus between the application processor and the end elements to be extended beyond the current 50 cm maximum length while providing a protocol that does not suffer from a high overhead associated with bus turnaround. In this regard, FIG. 2 is a block diagram of a modified SOUNDWIRE system 30 enabling long distance connections according to exemplary aspects of the present disclosure. The modified SOUNDWIRE system 30 includes an application processor 32 coupled to a bridge 34 by a long cable 36. The long cable 36 and other long cables described herein are sometimes referred to as digital audio cables. It should be appreciated that the application processor 32 may instead be a codec. In an exemplary aspect, the long cable 36 is expected to be greater than 50 cm (although it can be shorter and still work with exemplary aspects of the present disclosure), but less than two meters (2 m), and may use a 3.5 mm audio jack (not illustrated) or a Universal Serial Bus (USB) connector 38 (e.g., Type-C or micro-USB). The bridge 34 acts like a master for a SOUNDWIRE sub-system 40. The SOUNDWIRE sub-system 40 may include a plurality of microphones 44(1)-44(2) and a plurality of speakers 46(1)-46(2) (as well as any other audio components) that are slaves within the SOUNDWIRE sub-system 40. In an exemplary aspect, the SOUNDWIRE sub-system 40 may be instantiated in a headset (not illustrated). The bridge 34 may include a control system (not illustrated) that enables signal conversion between the long cable 36 and the SOUNDWIRE sub-system 40. The bridge 34 is coupled to the plurality of microphones 44(1)-44(2) and the plurality of speakers 46(1)-46(2) via a multi-wire bus 48 that is compliant with the SOUNDWIRE specification (i.e., multi-wire bus, including a clock line and one or more data lines, and less than 50 cm). In an exemplary aspect, the long cable 36 uses a first protocol described below, and the bridge 34 converts messages in the first protocol from the application processor 32 to a second protocol and converts messages in the second protocol from the SOUNDWIRE sub-system 40 to the first protocol. While it is contemplated that the second protocol is a SOUNDWIRE protocol, the present disclosure is not so limited, and other short range protocols may be used. It should also be appreciated that the application processor 32 sends and receives signals over the long cable 36 to the bridge 34 using the first protocol. To effectuate this capability, the application processor 32 may do a protocol conversion through an internal bridge (not illustrated in FIG. 2) or directly populate signals using the first protocol.

On the assumption that the SOUNDWIRE protocol is the protocol of most interest, the first protocol on the long cable 36 should generally look like the SOUNDWIRE protocol over long distance, enable low-cost accessories by using PDM transport having a low latency, allow seamless conversion from a conventional SOUNDWIRE port and frame structure into a frame in the first protocol, and provide a cost-effective solution from a system-level point of view—that is, computation and processing is primarily performed in the application processor 32, which is likely within a mobile terminal (e.g., a smart phone).

In this regard, according to exemplary aspects of the present disclosure, the first protocol defines a frame having a number of rows equal to a number of rows in the second protocol, and a number of columns equal to a number of columns in the second protocol multiplied by a number of lanes in the second protocol. Further, sub-frames in the first protocol are organized such that payload data from all lanes are in one row. Still further, all transmission (TX) bit slots are concatenated into one group and all receipt (RX) bit slots are concatenated into a second group. An exemplary frame is illustrated in FIG. 3.

Figure 3:
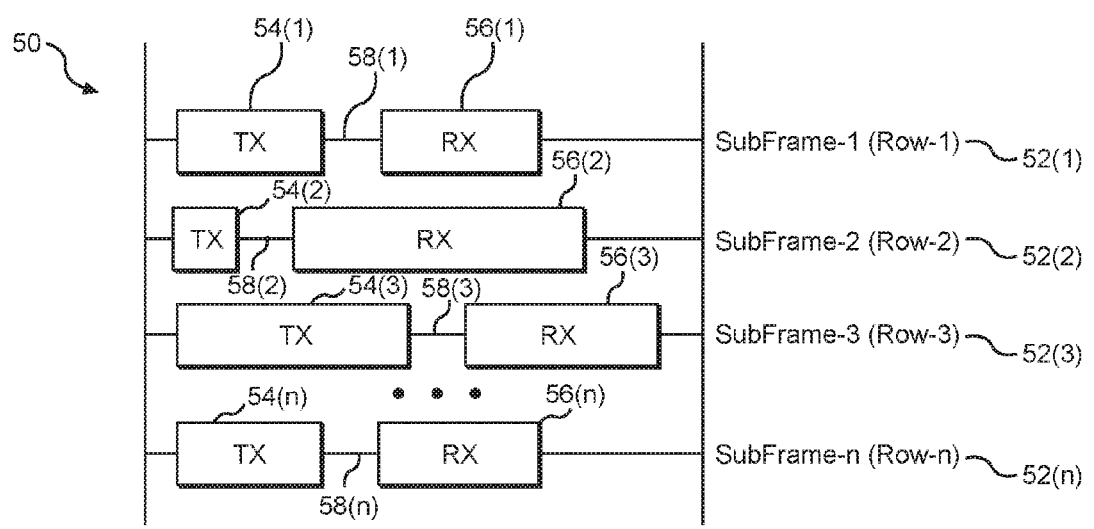
FIG. 3 is an illustration of an exemplary frame according to a protocol for the modified SOUNDWIRE system of FIG. 2 with concatenated signaling within a frame.

In this regard, FIG. 3 illustrates an exemplary frame 50 for use with the long cable 36 of FIG. 2. The frame 50 includes sub-frame rows 52(1)-52(n) corresponding to n rows in the SOUNDWIRE protocol for the SOUNDWIRE sub-system 40. All of the TX bit slots for each row are concatenated into respective TX groups 54(1)-54(n). Likewise, all of the RX bit slots for each row are concatenated into respective RX groups 56(1)-56(n). Turnaround delays, optional synchronization bits, optional polarity bits, and idle time for each row are generally denoted at respective gaps 58(1)-58(n). For the sake of clarity, in this example, it should be appreciated that the frame 50 represents a frame for point-to-point communication between the application processor 32 and the bridge 34 of FIG. 2. The use of TX and RX are arbitrary (in that what is sent (TX) from one side is received (RX) at the other point), but in an exemplary aspect, TX represents signals sent from the application processor 32 to the bridge 34 and RX represents signals sent from the bridge 34 to the application processor 32. Alternatively, these signals may be thought of as downstream (from the application processor 32 to the bridge 34) and upstream (from the bridge 34 to the application processor 32). As suggested by the size of the groups 54(1)-54(n) and 56(1)-56(n), each group may have a different number of bits. Concatenation in this fashion allows reduction in the amount of turnaround required on the bus to twice per sub-frame. Using this arrangement allows a payload rate of ((number of columns)/2)*(1/fSWR), where fSWR is the SOUNDWIRE bus clock frequency.

Figure 4:
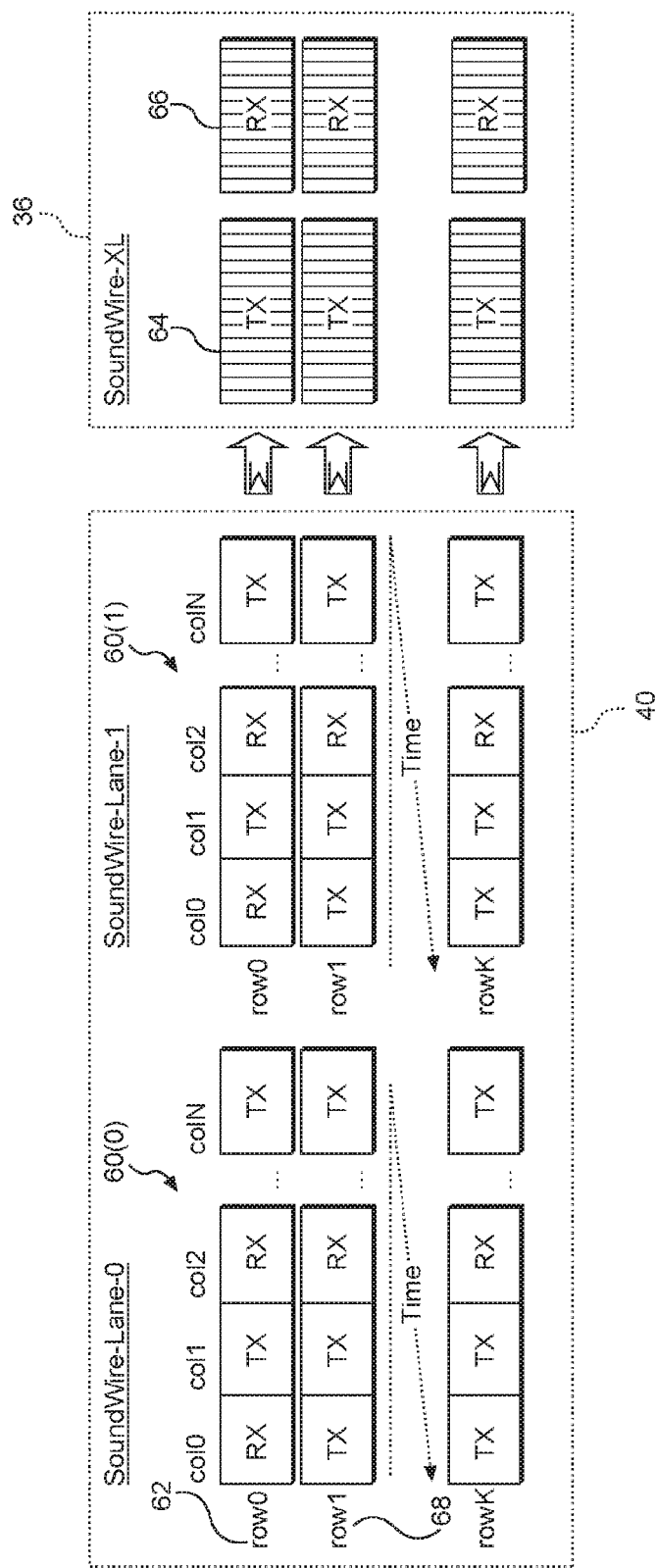
FIG. 4 is an illustration of how concatenation of signals may be manipulated to assemble the frame of FIG. 3.

FIG. 4 is an illustration of how concatenation of signals may be manipulated to assemble the frame 50 of FIG. 3. That is, the SOUNDWIRE sub-system 40 may have two data lanes 60(0)-60(1) representing two physical lines (the SOUNDWIRE specification supports up to eight) that operate in parallel. Exemplary aspects of the present disclosure take all this parallel data and place it serially on a data line of the long cable 36 with a minimum number of turnarounds through the concatenation of the signals. Again, this example assumes only point-to-point communication between two parties and the use of TX and RX is, as explained above, arbitrary. As illustrated, each of the TX bit slots within a row 62 is grouped into group 64 on the long cable 36. Likewise, each of the RX bit slots within the row 62 is grouped into group 66 on the long cable 36. Similar concatenation occurs for the other rows. Note that in row 68, the order of the TX and RX bit slots changes relative to the order in row 62. However, the concatenation does not specifically care about the order of the bit slots so long as like bit slots are grouped together. The rows are serially placed on the long cable 36. As alluded to above, the bridge 34 performs this concatenation (and reverses it for data going the other way). Likewise, the application processor 32 may convert a SOUNDWIRE compliant signal to the concatenated signal or may directly populate such a concatenated signal.

Figure 5:
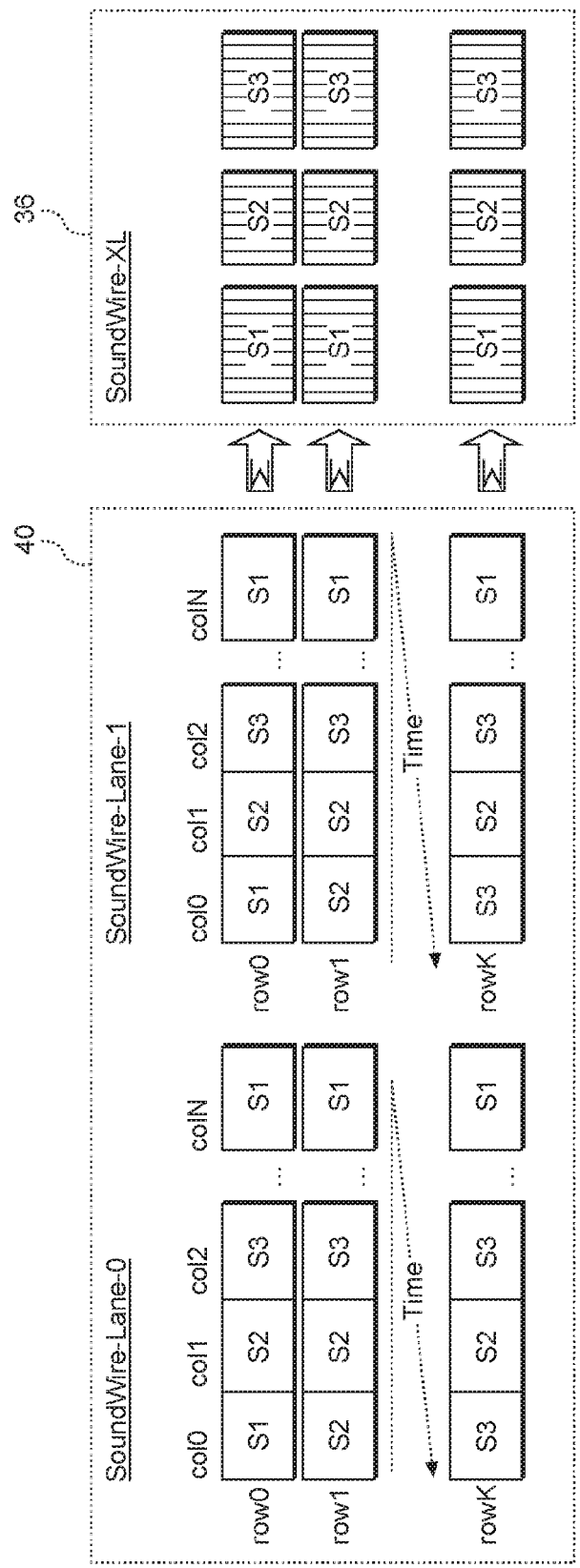
FIG. 5 is a more generic illustration of how concatenation of signals may be manipulated to assemble a frame.

FIG. 5 is a more generic illustration of how concatenation of signals may be manipulated to assemble a frame. This example refers to a multi-point connection through a long distance interface, and in particular, this specific example shows possible communication between three devices connected on this long distance interface. That is, the SOUNDWIRE specification supports up to eleven sources (although only two are illustrated in FIG. 4). As with FIG. 4, the sources may fit into bit slots. As illustrated in FIG. 5, there are three sources (S1, S2, and S3) using both Lane 0 and Lane 1 in the SOUNDWIRE sub-system 40. S1 represents the time slot that a first device is allowed to transmit, followed by a turnaround time. S2 represents the time slot for a second device to transmit, followed by a second turnaround. S3 represents the time slot of a third device to transmit, followed by a third turnaround, after which the bus ownership returns to the first device for S1. Common sources in each row are grouped on the long cable 36.

Figure 6A:
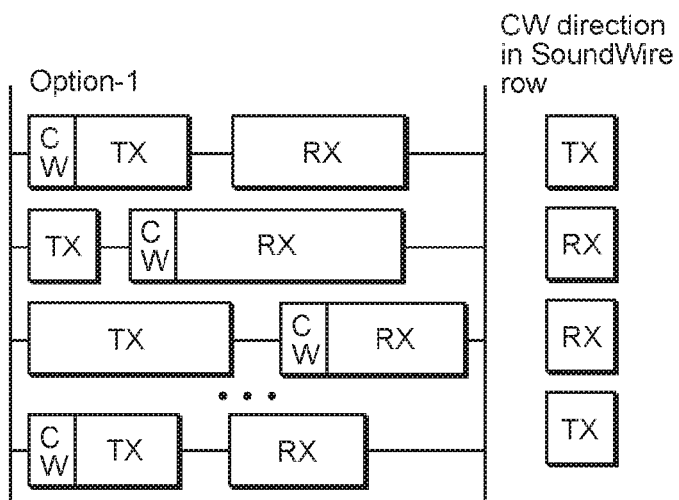
FIGS. 6A-6C illustrate possible command word placement with the concatenated signals of the modified SOUNDWIRE system of FIG. 2.
Figure 6B:
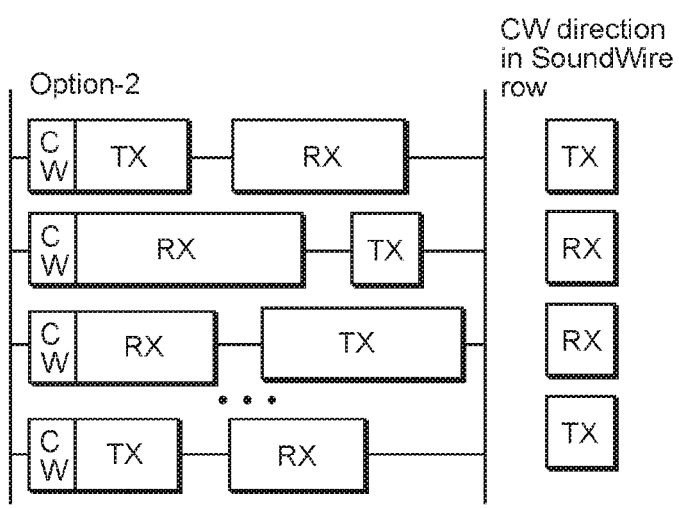
Figure 6C:
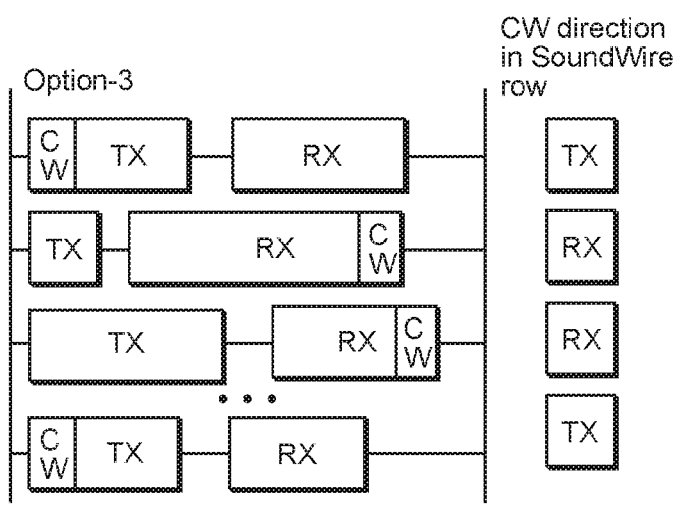

The SOUNDWIRE protocol uses a command word. Accordingly, the first protocol for the long cable 36 should also accommodate such command words. There are a number of possible options as illustrated in FIGS. 6A-6C. In the SOUNDWIRE protocol, the command word is the first bit slot of every row and its direction depends on device usage. Exemplary aspects of the present disclosure contemplate moving the command word. Thus, a first exemplary aspect is illustrated in FIG. 6A, where the command word (referenced in drawings as CW) is treated like any other payload bit and concatenated with the first bit of the RX group or the TX group depending on direction. A second exemplary aspect is illustrated in FIG. 6B, where the command word is always the first bit in the subframe. Therefore, the order of the groups may change according to the command word direction. A third exemplary aspect is illustrated in FIG. 6C, where the command word is concatenated to either the first bit of a row or last bit depending on direction.

Figure 7:
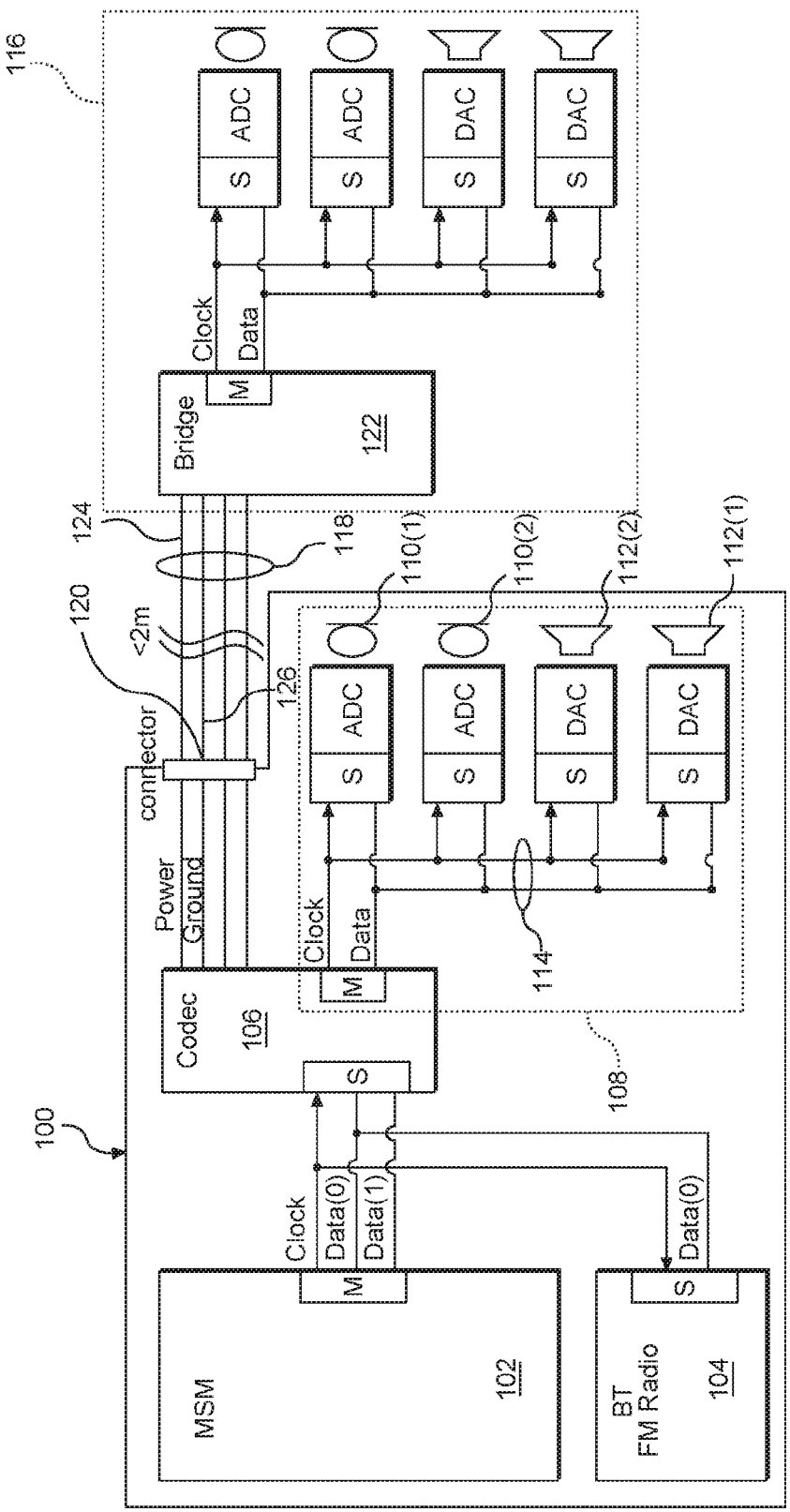
FIG. 7 illustrates the modified SOUNDWIRE system of FIG. 2 in use with a mobile terminal.

FIG. 7 illustrates the modified SOUNDWIRE system 30 of FIG. 2 in use in a mobile terminal 100. Specifically, the mobile terminal 100 may include a mobile station modem (MSM) 102 (which may be an application processor such as the application processor 12 or 32 previously discussed) and a BLUETOOTH™ or FM radio 104 coupled to a codec 106. The MSM 102 may be considered an application processor and is a master device. The codec 106 may serve as a master for a first SOUNDWIRE sub-system 108 for audio devices internal to the mobile terminal 100 such as speakers 110(1)-110(2) and microphones 112(1)-112(2). The codec 106 communicates with the speakers 110(1)-110(2) and the microphones 112(1)-112(2) through a SOUNDWIRE bus 114.

With continued reference to FIG. 7, the codec 106 is coupled to a second SOUNDWIRE sub-system 116 through a long cable 118. The long cable 118 may plug into the mobile terminal 100 with a connector 120 which may be a 3.5 mm jack or a USB connector (e.g., micro-USB or Type-C). The second SOUNDWIRE sub-system 116 is substantially similar to the SOUNDWIRE sub-system 40 of FIG. 2. As noted, a bridge 122 converts between the protocol of the long cable 118 and the SOUNDWIRE protocol used on the second SOUNDWIRE sub-system 116. The long cable 118 may, if desired, provide a power line 124 and a ground line 126. In an exemplary aspect, the second SOUNDWIRE sub-system 116 is instantiated as a low latency adaptive noise canceling headset.

Figure 8:
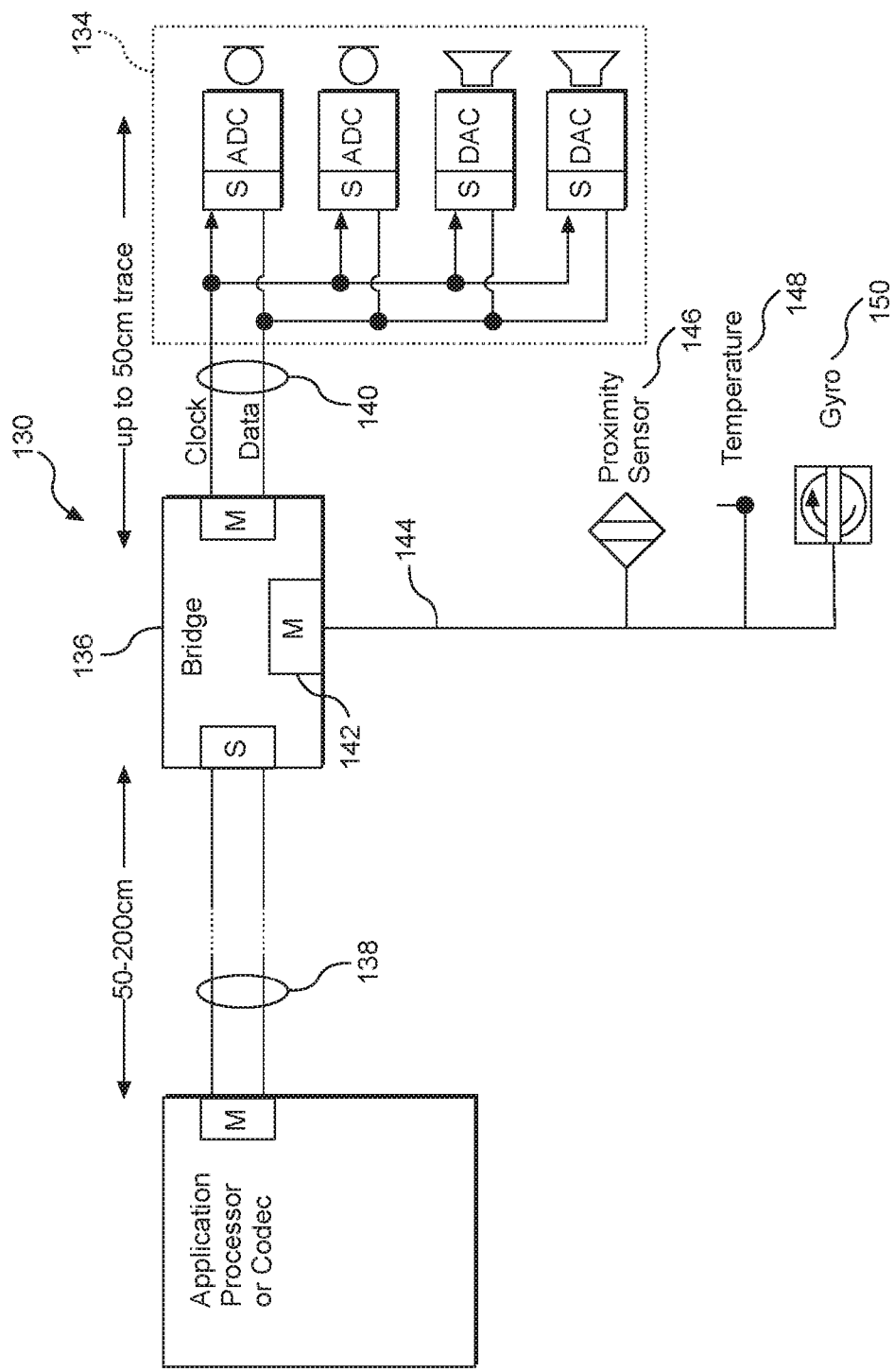
FIG. 8 illustrates an alternate aspect of a bridge with a sensor interface.
Figure 9:
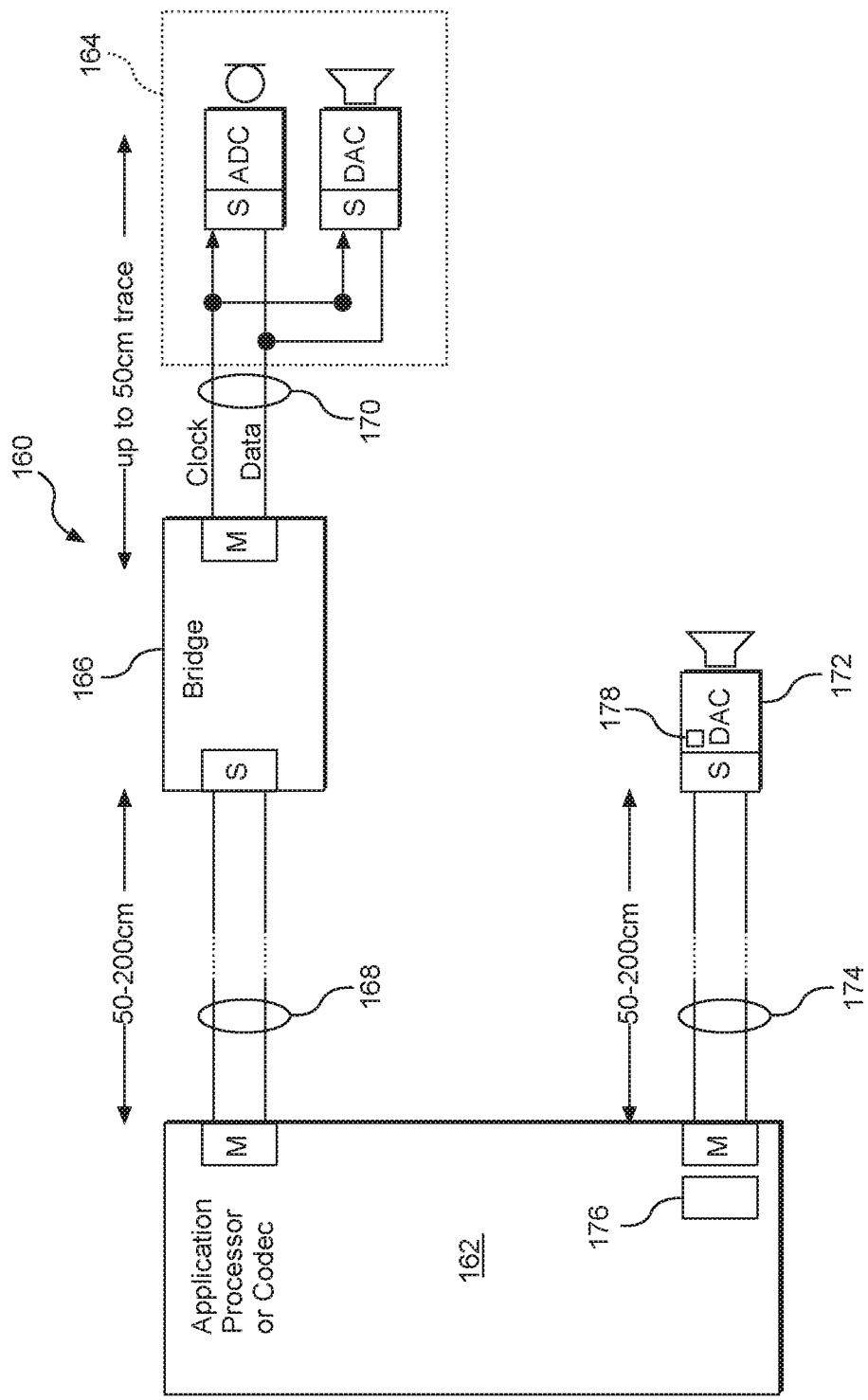
FIG. 9 illustrates an alternate aspect with a mixed SOUNDWIRE system.
Figure 10:
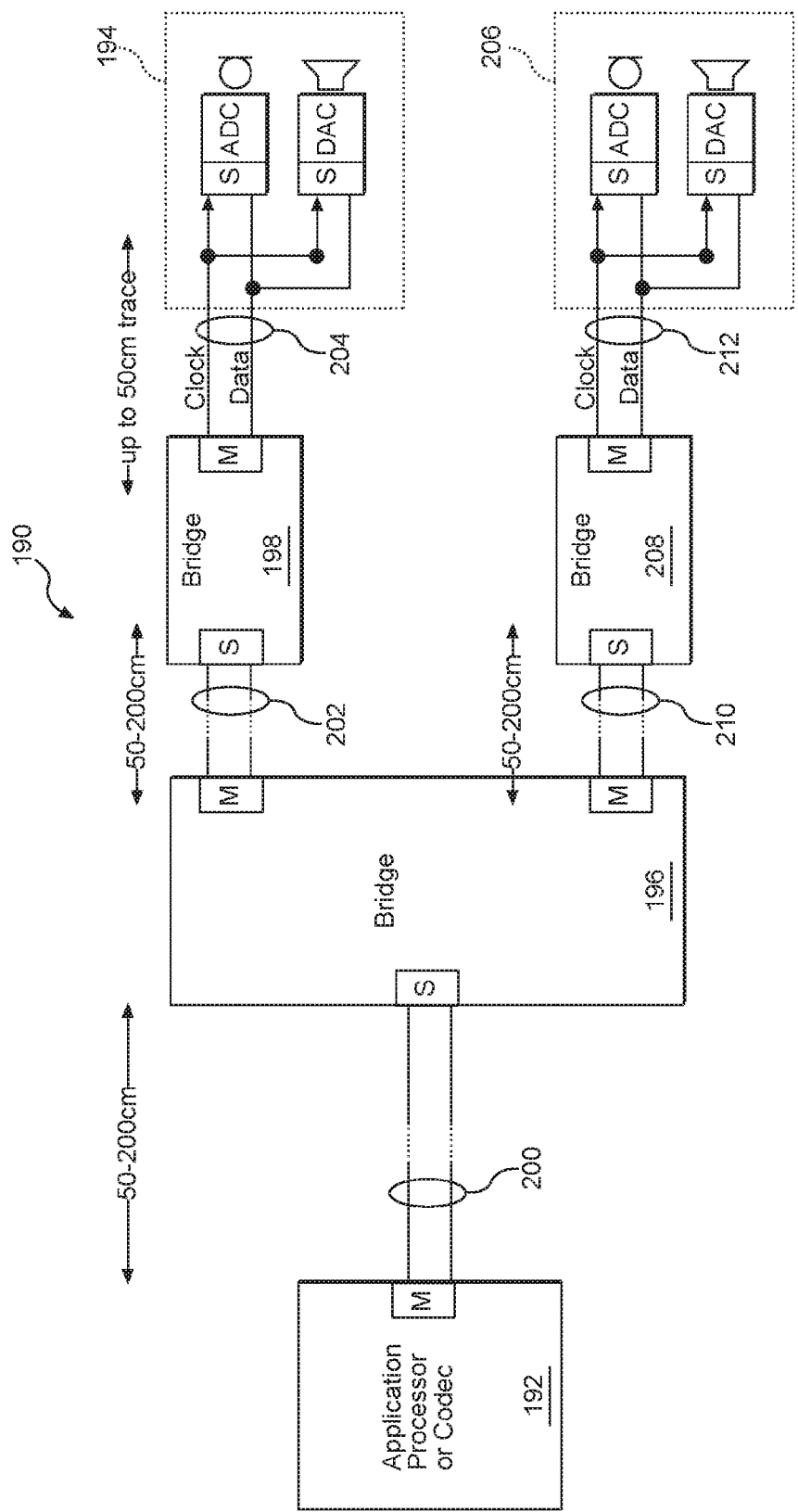
FIG. 10 illustrates an alternate aspect with cascaded SOUNDWIRE and modified SOUNDWIRE sub-systems.

While the above discussion has focused on a simple arrangement of a bridge between an application processor and a SOUNDWIRE sub-system, it should be appreciated that more complex arrangements are possible and within the scope of the present disclosure. In this regard, FIGS. 8-10 illustrate various alternate arrangements. While these three additional arrangements are specifically illustrated, it should be appreciated that other arrangements are possible, and the arrangements disclosed herein are intended to be exemplary and not exhaustive.

In this regard, FIG. 8 illustrates a system 130 having an application processor 132 coupled to a SOUNDWIRE sub-system 134 through a bridge 136 by a long cable 138 and a multi-wire bus 140. At this point the system 130 resembles the modified SOUNDWIRE system 30 of FIG. 2. However, the bridge 136 may further include a sensor interface 142 which couples to a sensor bus 144. The sensor bus 144 may support multiple sensors such as a proximity sensor 146, a temperature sensor 148, and a gyroscope 150 or the like. Note that the sensor bus 144 may be removably coupled to the sensor interface 142, and thus the sensor interface 142 may be configured to couple to the sensor bus 144. Sensor signals may be concatenated at the bridge 136 for transmission on the long cable 138.

Instead of sensors, it should be appreciated that the application processor may support multiple long connections. In this regard, FIG. 9 illustrates a system 160 having an application processor 162 coupled to a SOUNDWIRE sub-system 164 through a bridge 166 via a long cable 168 and multi-wire bus 170. In addition, the application processor 162 may be coupled to a SOUNDWIRE compliant slave 172 directly by a second long cable 174. In such case, the application processor 162 may have an internal bridge 176 that translates SOUNDWIRE compliant signals to the concatenated signaling protocol (and vice versa) described above. Further, the SOUNDWIRE compliant slave 172 may have an internal bridge 178 that translates the concatenated signaling protocol to SOUNDWIRE compliant signals (and vice versa). While described as the internal bridges 176 and 178, it should be appreciated that such functionality may be implemented without a traditional distinct bridge component.

Again, while the systems 130 and 160 are relatively simple, the present disclosure is not so limited. In this regard, FIG. 10 illustrates system 190 with cascaded bridges and multiple SOUNDWIRE sub-systems. Specifically the system 190 includes an application processor 192 coupled to a first SOUNDWIRE sub-system 194 through a first bridge 196 and a second bridge 198 via long cable 200 and long cable 202 as well as multi-wire bus 204. Additionally, the application processor 192 is coupled to a second SOUNDWIRE sub-system 206 through the first bridge 196 and a third bridge 208 via the long cable 200 and long cable 210 as well as multi-wire bus 212. The first bridge 196 may include appropriate control logic to route signals to the long cable 202 or the long cable 210 depending on ultimate destination. Likewise, signals from the long cable 202 and the long cable 210 are combined for transmission to the application processor 192. Note further that the first bridge 196 may forego protocol translation since the first bridge 196 is coupled to the long cables 200, 202, and 210.

Figure 11:
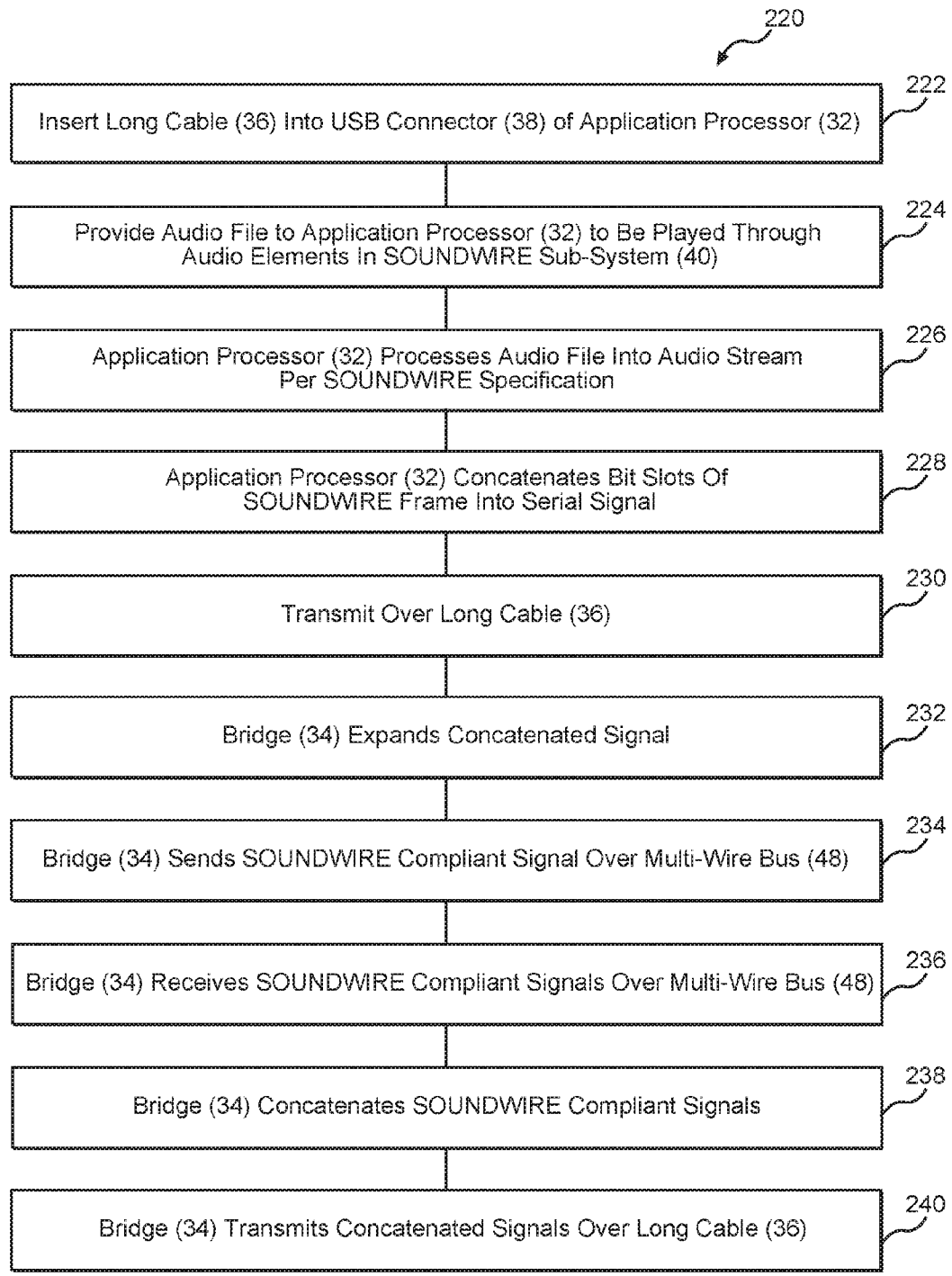
FIG. 11 illustrates a flowchart associated with exemplary processes of the present disclosure.

Against the backdrop of the various systems described above, a simplified flowchart associated with exemplary processes of the present disclosure is provided with reference to FIG. 11. In this regard, FIG. 11 illustrates process 220 which begins with the insertion of the long cable 36 into the USB connector 38 associated with the application processor 32 of FIG. 2 (block 222). An audio source (not illustrated) provides an audio file to the application processor 32 to be played through audio elements in the SOUNDWIRE sub-system 40 (block 224). The application processor 32 processes the audio file into an audio stream with frames having bit slots per the SOUNDWIRE specification (block 226). The application processor 32 may then concatenate the bit slots of the SOUNDWIRE frame into a serial signal (block 228). The application processor 32 causes the concatenated signal to be transmitted over the long cable 36 (block 230). The bridge 34 receives the concatenated signal and expands the concatenated signal (block 232) into a SOUNDWIRE compliant signal. The bridge 34 then sends the SOUNDWIRE compliant signal over the multi-wire bus 48 (block 234).

With continued reference to FIG. 11, the bridge 34 also receives SOUNDWIRE compliant signals over the multi-wire bus 48 (block 236) and concatenates the SOUNDWIRE compliant signals (block 238). The bridge 34 then transmits the concatenated signals over the long cable 36 (block 240) to the application processor 32.

The low latency transmission systems and methods for long distances in SOUNDWIRE systems according to aspects disclosed herein may be provided in or integrated into any processor-based device that may include a SOUNDWIRE system. Examples, without limitation, include a set top box, an entertainment unit, a navigation device, a communications device, a fixed location data unit, a mobile location data unit, a mobile phone, a cellular phone, a smart phone, a tablet, a phablet, a server, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A mobile terminal comprising:
   an audio cable receptacle;
   an interface associated with the audio cable receptacle; and
   a control system configured to:
   receive SOUNDWIRE compliant signals from one of an application processor and a codec;
   concatenate into respective groups bit slots for plural channels;
   transmit the respective groups through the interface onto a digital audio cable;
   receive second concatenated bit slots from the digital audio cable; and
   split the second concatenated bit slots for processing by the one of the application processor and the codec.

2. The mobile terminal of claim 1, wherein the control system is further configured to concatenate into respective groups bit slots from plural sources.

3. The mobile terminal of claim 1, wherein the control system is further configured to determine a number of lanes used by the SOUNDWIRE compliant signals.

4. The mobile terminal of claim 3, wherein the control system is further configured to determine a number of rows and columns used in a frame by the SOUNDWIRE compliant signals.

5. The mobile terminal of claim 4, wherein the control system is further configured to define a number of rows in signals transmitted on the digital audio cable equal to the number of rows used by the SOUNDWIRE compliant signals.

6. The mobile terminal of claim 5, wherein the control system is further configured to define a number of columns in signals transmitted on the digital audio cable equal to the number of columns used by the SOUNDWIRE compliant signals multiplied by the number of lanes used by the SOUNDWIRE compliant signals.

7. A headset comprising:
   a plurality of microphones;
   a plurality of speakers;
   an audio cable receptacle;
   an interface associated with the audio cable receptacle; and
   a control system configured to:
   receive concatenated bit slots from a digital audio cable;
   split the concatenated bit slots for processing by one of the plurality of microphones or one of the plurality of speakers; and
   concatenate into respective groups bit slots received from the plurality of microphones and the plurality of speakers.

8. The headset of claim 7, further comprising a SOUNDWIRE communication bus coupling the control system to the plurality of microphones and the plurality of speakers.

9. The headset of claim 7, wherein the control system is further configured to transmit the concatenated bit slots from the plurality of speakers onto the digital audio cable.

10. A method comprising:
    receiving SOUNDWIRE compliant signals from one of an application processor and a codec in a mobile terminal;
    concatenating into respective groups bit slots for plural channels;
    transmitting the respective groups through an interface onto a digital audio cable;
    receiving second concatenated bit slots from the digital audio cable; and
    splitting the second concatenated bit slots for processing by the one of the application processor and the codec.

11. A headset comprising:
    a plurality of microphones;
    an audio cable receptacle;
    an interface associated with the audio cable receptacle; and
    a control system configured to:
    receive concatenated bit slots from a digital audio cable;
    split the concatenated bit slots for processing by one of the plurality of microphones; and concatenate into respective groups bit slots received from the plurality of microphones.

12. A headset comprising:

a plurality of speakers;

an audio cable receptacle;

an interface associated with the audio cable receptacle; and a control system configured to:
  receive concatenated bit slots from a digital audio cable;
  split the concatenated bit slots for processing by one of the plurality of speakers; and
  concatenate into respective groups bit slots received from the plurality of speakers.

13. A method comprising:

receiving concatenated bits slots from a digital audio cable at a headset;

splitting the concatenated bit slots for processing by one of a plurality of speakers or a plurality of microphones in the headset; and concatenating into respective groups bit slots received from the plurality of speakers and the plurality of microphones.

* * * * *